United States Patent
Iwamoto et al.

(10) Patent No.: US 6,797,734 B2
(45) Date of Patent: Sep. 28, 2004

(54) POLYPROPYLENE RESIN PRE-EXPANDED PARTICLE AND IN-MOLD EXPANDED ARTICLE THEREOF

(75) Inventors: Tomonori Iwamoto, Settsu (JP); Takayuki Goda, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/433,873

(22) PCT Filed: Sep. 27, 2002

(86) PCT No.: PCT/JP02/10116

§ 371 (c)(1), (2), (4) Date: Jun. 4, 2003

(87) PCT Pub. No.: WO03/029336

PCT Pub. Date: Apr. 10, 2003

(65) Prior Publication Data

US 2004/0054042 A1 Mar. 18, 2004

(30) Foreign Application Priority Data

Sep. 28, 2001 (JP) ........................................ 2001-299003
Feb. 15, 2002 (JP) ........................................ 2002-038288
Aug. 2, 2002 (JP) ........................................ 2002-226321

(51) Int. Cl.$^7$ ................................................. C08J 9/22
(52) U.S. Cl. .............................. 521/58; 521/56; 521/60
(58) Field of Search ................................. 521/58, 56, 60

(56) References Cited

FOREIGN PATENT DOCUMENTS

| JP | 56-18626 A | 2/1981 |
| JP | 2000-273233 A | 10/2000 |
| JP | 2001-131327 A | 5/2001 |

OTHER PUBLICATIONS

International Search Report Corresponding to International Application No. PCT/JP02/10116 From the Japanese Patent Office Dated Dec. 10, 2002.

*Primary Examiner*—Morton Foelak
(74) *Attorney, Agent, or Firm*—Brinks Hofer Gilson & Lione

(57) ABSTRACT

The present invention provides polypropylene resin pre-expanded particles having small fluctuation in cell diameter and expansion ratio compared to in the past. The pre-expanded particles are obtained by having as a base resin, a polypropylene resin composition comprising polypropylene resin (A), a compound having a triazine skeleton and molecular weight of at most 300 per triazine skeleton unit (B) and as a random component, hydrophilic polymer (C) and inorganic filler (D) and water as the foaming agent. By using the pre-expanded particles, a polypropylene resin in-mold expanded article having decreased unevenness in color and fluctuation in weight can be obtained.

17 Claims, No Drawings

POLYPROPYLENE RESIN PRE-EXPANDED PARTICLE AND IN-MOLD EXPANDED ARTICLE THEREOF

RELATED APPLICATIONS

This application is a nationalization of PCT Application No. PCT/JP02/10116 filed Sep. 27, 2002. This application claims priority from Japanese Patent Application No. 2001-299003 filed on Sep. 28, 2001; Japanese Patent Application No. 2002-38288 filed on Feb. 15, 2002; and Japanese Patent Application No. 2002-22632 1 filed on Aug. 2, 2002.

TECHNICAL FIELD

The present invention relates to a polypropylene resin pre-expanded particle and an in-mold expanded article thereof. More specifically, the present invention relates to a polypropylene resin pre-expanded particle which can suitably be used for preparing an in-mold expanded article of polypropylene resin used in cushioning packaging material, returnable containers, insulating material or bumper core of an automobile, and an in-mold expanded article made of the particles.

BACKGROUND ART

Conventionally, a method of preparing pre-expanded particles by dispersing polypropylene resin particles in an aqueous dispersion medium along with a foaming agent, raising the temperature, making the pressure and temperature constant to impregnate the foaming agent in polyolefin resin particles and then discharging into low pressure atmosphere, is known. Regarding the foaming agent, disclosed are the methods of using a volatile organic foaming agent such as propane or butane (JP-B-56-1344) and using inorganic gas such as carbon dioxide, nitrogen and air (JP-B-4-64332, JP-B-4-64334).

However, volatile organic foaming agents are expensive and so costs will rise. Also, volatile organic foaming agents such as propane and butane have the effect of placticizing polyolefin resin and though high expansion ratio can be obtained, due to the placticizing effect, there are problems such as difficulty in controlling the expansion ratio and crystal structure of the pre-expanded particle.

When using inorganic gas such as carbon dioxide, nitrogen and air, because the inorganic gas is difficult to be impregnated into the polyolefin resin, usually impregnation must be conducted at a high pressure of approximately 3 to 6 MPa. As a result, the impregnating vessel for impregnating the foaming agent into the polyolefin resin must have high pressure resistant properties and so there is the problem of high facility costs.

As a method for economically preparing polyolefin resin pre-expanded particles which can suitably be used for preparing an in-mold expanded article and solves the above problems, a method of using the water used for the dispersion medium as a foaming agent has been suggested.

A method using water as a foaming agent which has been suggested is the method of preparing crystalline polyolefin polymer expanded particles, which comprises dispersing crystalline polyolefin polymer particles containing 10 to 70% by weight of an inorganic filler into water which is the dispersion medium in a sealed vessel, impregnating the water which is the dispersion medium under pressure which is higher than the saturated vapor pressure of the dispersion liquid and temperature which is at most the melting point of the crystalline polyolefin polymer particles, while maintaining a high pressure range which is under the temperature conditions in which crystallization of the polymer particles progresses, and then discharging the dispersion liquid in a low pressure range (JP-B-49-2183). However, because the pre-expanded particles obtained in this way contain a great deal of inorganic filler, cell diameter is extremely small, open cell ratio tends to become high and fusion, surface appearance and mechanical properties such as compressive strength when made into an in-mold expanded article are not sufficient.

Another method which has been suggested is the method of preparing propylene random copolymer resin expanded particles which comprises dispersing propylene-ethylene random copolymer resin particles containing 1 to 12% by weight of ethylene into water in a sealed vessel, then introducing inorganic gas to make the pressure within the vessel at least 5 kg/cm$^2$G, heating to a temperature which is between the melting point of the copolymer resin particles and 25° C. higher than the melting point and discharging the dispersion liquid in a low pressure atmosphere (Japanese Patent No. 1880374). However, according to this method, in order to impregnate with water, high temperature and high pressure conditions must be maintained for a long period and productivity is extremely low. Also, the fluctuation in expansion ratio of the obtained pre-expanded particles is not of a satisfactory level.

Another method which has been suggested is the method of preparing polyolefin resin pre-expanded particles, which comprises dispersing polyolefin resin particles containing a hydrophilic polymer and an inorganic filler into water in a sealed vessel, then heating to at least the softening temperature of the resin particles to make water containing polyolefin resin particles, and then discharging the dispersion liquid in a low pressure atmosphere (for example JP-A-9-838048, JP-A-10-306179, JP-A-11-106576). By this method, polyolefin resin pre-expanded particles having a high expansion ratio can be obtained under low pressure in the vessel, compared to the case of using inorganic gas such as carbon dioxide, nitrogen and air as a foaming agent. In addition, maintenance of high temperature and high pressure for a long period is unnecessary and economical production is possible. As for the obtained polyolefin resin pre-expanded particles, fluctuation in expansion ratio and cell diameter is small and also, fusion and surface appearance of the in-mold expanded article are favorable.

However, regarding fluctuation in expansion ratio and cell diameter, the level of demand has become higher than in the past. Even in the method of preparing polyolefin resin pre-expanded particles by using polyolefin resin particles containing a hydrophilic polymer and an inorganic filler and using water for the dispersion medium as a foaming agent, cases in which fluctuation in expansion ratio and cell diameter do not satisfy the level of demand are arising and further improvement is desired.

When fluctuation in expansion ratio is large, there is the problem of large fluctuation in weight when made into an in-mold expanded article. In recent years, quality standards for products have become more severe and in order to cut down on the man hour for weight examination of the in-mold expanded article, pre-expanded particles having smaller fluctuation in expansion ratio than in the past are in demand.

In addition, further improvement is in demand as fluctuation in cell diameter causes unevenness in color and damages in appearance. In the case of an in-mold expanded article colored by including pigment or dye, particularly in the case of an in-mold expanded article colored in black, unevenness in color is more noticeable than in an in-mold expanded article which is uncolored and white and therefore demand for improvement in fluctuation of cell diameter is strong.

DISCLOSURE OF INVENTION

The object of the present invention is to provide pre-expanded articles having little fluctuation in cell diameter and expansion ratio and decreased unevenness in color and weight fluctuation when made into an in-mold expanded article in the case of preparing polypropylene resin pre-expanded particles by using water as a foaming agent.

As a result of devoted research to achieve this goal, it was found that the above objective could be achieved by using as a base resin, a polypropylene resin composition prepared by adding a compound having a specific triazine skeleton to polypropylene resin and the present invention was completed.

The present invention relates to a polypropylene resin pre-expanded particle comprising as a base resin a polypropylene resin composition containing polypropylene resin (A) and a compound having a triazine skeleton and molecular weight of at most 300 per triazine skeleton unit (B).

The above polypropylene resin pre-expanded particle may also comprise hydrophilic polymer (C).

The above polypropylene resin pre-expanded particle preferably contains 0.005 to 6 parts by weight of the compound (B) having a triazine skeleton and molecular weight of at most 300 per triazine skeleton unit based on 100 parts by weight of polypropylene resin (A).

The above polypropylene resin pre-expanded particle preferably contains 0.01 to 20 parts by weight of the hydrophilic polymer (C) based on 100 parts by weight of polypropylene resin (A).

The above polypropylene resin pre-expanded particle may also comprise inorganic filler (D).

The above polypropylene resin pre-expanded particle preferably contains 0.05 to 10 parts by weight of the inorganic filler (D) based on 100 parts by weight of polypropylene resin (A).

In the above polypropylene resin pre-expanded particle, the polypropylene resin (A) is at least one member selected from the group consisting of ethylene-propylene random copolymer, propylene-butene-1 random copolymer and ethylene-propylene-butene-1 random copolymer, or a combination thereof.

In the above polypropylene resin pre-expanded particle, the compound (B) having a triazine skeleton and molecular weight of at most 300 per triazine skeleton unit is at least one member selected from the group consisting of melamine, isocyanuric acid and melamine isocyanurate, or a combination thereof.

In the above polypropylene resin pre-expanded particle, the hydrophilic polymer (C) is preferably an ethylene ionomer resin obtained by crosslinking ethylene-(meth)acrylic acid copolymer with alkali metal ion.

The above polypropylene resin pre-expanded particle preferably has two melting peaks in the DSC curve obtained by differential scanning calorimetry.

Furthermore, the present invention relates to an in-mold expanded article comprising the above polypropylene resin pre-expanded particle.

BEST MODE FOR CARRYING OUT THE INVENTION

The polypropylene resin pre-expanded particle of the present invention contains (A) polypropylene resin and (B) a compound having a triazine skeleton and molecular weight of at most 300 per triazine skeleton unit.

Examples of the polypropylene resin (A) used in the present invention are propylene homopolymer, α-olefin-propylene random copolymer and α-olefin-propylene block copolymer. These may be used alone or in combination of two or more kinds. Particularly, ethylene-propylene random copolymer, ethylene-propylene-butene-1 random copolymer and propylene-butene-1 random copolymer exhibit good foaming properties and may be suitably used.

In order to obtain pre-expanded particles excellent in foaming properties and moldability and excellent in mechanical strength and heat resistance when made into an in-mold expanded article, the above polypropylene resin preferably has a usual melting point of 130° to 165° C., more preferably 135° to 155° C. and a usual melt index (hereinafter MI value) of 0.5 to 30 g/10 minutes, more preferably 2 to 20 g/10 minutes.

When the melting point is lower than 130° C., heat resistance and mechanical strength tend to be insufficient. When the melting point is higher than 165° C., melt adhesion of pre-expanded particles during in-mold expansion molding tends to become difficult to acquire. When the MI value is less than 0.5 g/10 minutes, pre-expanded particles having high expansion ratio are hard to obtain and when the MI value is greater than 30 g/10 minutes, the expanded cells tend to break easily and the open cell ratio of the pre-expanded particles tends to become high.

Here, melting point is the peak temperature of the endothermic peak in the DSC curve obtained by heating 1 to 10 mg of polypropylene resin from 40° C. to 220° C. at a rate of 10° C./minute, then cooling to 40° C. at a rate of 10° C./minute and then heating again to 220° C. at a rate of 10° C./minute using a differential scanning calorimeter. Furthermore, MI value is the value when measured according to JIS K7210 at a temperature of 230° C. and a load of 2.16 kg.

In the present invention, a compound having a triazine skeleton and molecular weight of at most 300 per triazine skeleton unit (B) (hereinafter, may be described as triazine compound) is used. Here, molecular weight per triazine skeleton unit is the value obtained by dividing the molecular weight by the number of triazine skeletons contained in one molecule. The triazine compound increases the water content of polypropylene resin composition particles, provides polypropylene resin pre-expanded particles having high expansion ratio and has the effect of controlling fluctuation in expansion ratio and cell diameter. However, in the case that the molecular weight per triazine skeleton unit exceeds 300, the effect of increasing water content and controlling fluctuation in expansion ratio and cell diameter is not sufficiently exhibited. The molecular weight per triazine skeleton unit is preferably 100 to 200.

Examples of the above triazine compound are melamine (chemical name 1,3,5-triazine-2,4,6-triamine), ammeline (1,3,5-triazine-2-hydroxy-4,6-diamine), ammelide (1,3,5-triazine-2,4-dihydroxy-6-amine), cyanuric acid (1,3,5-triazine-2,4,6-triol), isocyanuric acid (1,3,5-triazine-2,4,6 (1H,3H,5H)-trion), acetoguanamine (1,3,5-triazine-2,4-diamine-6-methyl), benzoguanamine (1,3,5-triazine-2,4-diamine-6-phenyl), tris(methyl)isocyanurate, tris(ethyl) isocyanurate, tris(butyl)isocyanurate, tris(2-hydroxyethyl) isocyanurate and melamine isocyanurate. These may be used alone or in combination of two or more kinds. Particularly, melamine, isocyanuric acid and melamine isocyanurate are preferably used as the effect of increasing water content and controlling fluctuation in expansion ratio and cell diameter is high.

In order to obtain a more uniform and favorable cell structure, the above triazine compound preferably has an average particle size of 0.1 to 800 μm, more preferably 1 to 100 μm, and the more uniform the particle size, the more preferable they are. Also, in order to prevent caking, 0.1 to 1% by weight of metallic soap such as magnesium stearate, barium stearate and calcium stearate may be compounded into the triazine compound.

Furthermore, the triazine compound preferably is solid particles at the processing temperature when preparing polypropylene resin composition particles. When the compound has a melting point, the melting point is preferably at least 180° C. When the compound decomposes without having a melting point, the decomposition temperature is preferably at least 230° C.

The amount to be used of the above compound having a triazine skeleton and molecular weight of at most 300 per triazine skeleton unit is not particularly limited but usually, the upper limit of the amount to be used is preferably 6 parts by weight, more preferably 3 parts by weight, based on 100 parts by weight of the polypropylene resin. The lower limit of the amount to be used is preferably 0.05 part by weight, more preferably 0.1 part by weight. When the amount is less than 0.05 part by weight, the effect of controlling fluctuation in expansion ratio and cell diameter tends to be insufficient. When the amount is greater than 6 parts by weight, moldability tends to decrease as cell diameter becomes fine and the open cell ratio rises.

The polypropylene resin pre-expanded particles of the present invention may also contain hydrophilic polymer (C). Examples of the hydrophilic polymer (C) to be used in the present invention are polymer containing a carboxyl group such as ethylene-acrylic acid-maleic anhydride terpolymer, ethylene-(meth) acrylic acid copolymer or ionomer resin prepared by crosslinking ethylene-(meth)acrylic acid copolymer with metal ion; polyamide such as nylon 6, nylon 6,6 or copolymerized nylon and thermoplastic polyester elastomer such as a block copolymer of polybutylene terephthalate and polytetramethylene glycol. These may be used alone or in a combination of two or more kinds. Particularly, ethylene ionomer resin prepared by crosslinking ethylene-(meth)acrylic acid copolymer with alkali metal ion such as sodium ion or potassium ion is preferable as it provides good water content and expandability. Furthermore, ethylene ionomer resin prepared by crosslinking ethylene-(meth) acrylic acid copolymer with potassium ion is particularly preferable as it provides a larger average cell diameter.

The above hydrophilic polymer also acts as a water absorption agent and though using the hydrophilic polymer is not mandatory, by using it, expandability are increased, that is pre-expanded particles having high expansion ratio become easier to obtain. As described in "Background Art", pre-expanded particles having high expansion ratio can also be obtained from a polypropylene resin composition containing a hydrophilic polymer and an inorganic filler, but the fluctuation in cell diameter and expansion ratio is not small enough. By using in combination with the triazine compound, pre-expanded particles having sufficiently small fluctuation in cell diameter and expansion ratio can be obtained.

The amount to be used of the hydrophilic polymer depends on the type of hydrophilic polymer and is not particularly limited. Usually, the upper limit of the amount to be used is preferably 20 parts by weight, more preferably 10 parts by weight, based on 100 parts by weight of the polypropylene resin. The lower limit of the amount to be used is 0.01 part by weight, more preferably 0.1 part by weight. Further preferably, the upper limit of the amount to be used is 5 parts by weight and the lower limit of the amount to be used is 0.3 part by weight. When the amount is less than 0.01 part by weight, the effect of improving expansion ratio tends to become small. When the amount is greater than 20 parts by weight, decrease in heat resistance and mechanical strength tends to become large.

Furthermore, the polypropylene resin pre-expanded particles of the present invention may contain inorganic filler (D). Examples of the inorganic filler (D) to be used in the present invention are clay such as talc, mica, kaoline, montmorillonite, bentonite, attapulgite, laponite and sepiolite, natural or synthetic silica, natural or synthetic calcium carbonate, titanium oxide and zinc oxide. These may be used alone or in a combination of two or more kinds. Particularly, talc having an average particle size of 1 to 20 μm, mica having an average particle size of 1 to 20 μm, swellable mica having an average particle size of 0.1 to 10 μm, kaoline having an average particle size of 0.1 to 10 μm, wet synthetic silica having an average particle size of 0.1 to 10 μm and the same with modified surface, dry synthetic silica having an average particle size of 0.001 to 0.05 μm and the same with modified surface, precipitated calcium carbonate having an average particle size of 0.05 to 0.5 μm and a surface modified article thereof, refined bentonite having an average particle size of 1 to 20 μm, attapulgite having an average particle size of 0.05 to 0.5 μm and laponite having an average particle size of 10 to 200 μm provide favorable cell structure and can be used suitably.

The above inorganic filler also acts as a cell nucleating agent and assists uniform cell formation. Though using the inorganic filler is not mandatory, by using it, expandability are increased, that is, pre-expanded particles having high expansion ratio become easier to obtain. The amount to be used of the inorganic filler is not particularly limited, but the upper limit of the amount to be used is 10 parts by weight, more preferably 5 parts by weight based on 100 parts by weight of the polypropylene resin. The lower limit of the amount to be used is preferably 0.005 part by weight, more preferably 0.01 part by weight. When the amount is greater than 10 parts by weight, mechanical strength and impact resistance when the pre-expanded particles are made into an in-mold expanded article tend to become small.

The polypropylene resin composition comprising polypropylene resin (A), a compound having a triazine skeleton and molecular weight of at most 300 per triazine skeleton unit (B) and containing when necessary, hydrophilic polymer (C) and inorganic filler (D), is usually melted using an extruder, kneader, Banbury mixer (trademark) or roll. The composition is processed into resin particles of the desired particle shape such as a cylinder, elliptic cylinder, sphere, cube or rectangular parallelepiped and the weight of each resin particle is 0.2 to 10 mg, preferably 0.5 to 6 mg, more preferably 1 to 5 mg. According to need, additives such as a coloring agent including carbon black, antistatic agent, flame retardant, antioxidant and UV stabilizer agent may be added.

Conventionally known methods may be used for preparing the polypropylene resin pre-expanded particles of the present invention. For example, the pre-expanded particles are prepared by a method which comprises charging a sealed vessel with an aqueous dispersion medium containing the above resin particles, dispersant and auxiliary dispersant, heating to a constant temperature while agitating to add water to the resin particles, maintaining a constant pressure by inorganic gas (excluding carbon dioxide) such as nitrogen and air and discharging into atmosphere in which pressure is lower than that within the sealed vessel, through a flow-restricting device (open orifice) having an opening of 2 to 10 mmφ. The low pressure atmosphere is preferably maintained at a high temperature in order to raise the expansion ratio and more preferably is maintained at 90° to 100° C. by vapor. Furthermore, using a flow-restricting device which prevents spreading of the contents within the sealed vessel when discharging, and colliding the discharged substance into a collision board are preferable as pre-expanded particles having smaller fluctuation in expansion ratio can be obtained. The sealed vessel to be used is not particularly limited as long as it withstands the pressure and temperature within the vessel when preparing the pre-expanded particles and an example is an autoclave type pressure resistant vessel.

Examples of the dispersant are hardly water soluble inorganic compounds such as basic calcium tertiary phosphate, basic magnesium carbonate and calcium carbonate and examples of the above auxiliary dispersant are anionic surfactants such as sodium dodecylbenzenesulfonate, sodium n-paraffinsulfonate and sodium α-olefin sulfonate. Of these, the use of basic calcium tertiary phosphate and sodium n-paraffinsulfonate are preferable in view of obtaining good dispersion properties. The amount to be used of the dispersant and auxiliary dispersant depends on the type thereof and the type and amount of the polypropylene resin to be used but is usually 0.1 to 3 parts by weight of dispersant, 0.0001 to 0.1 part by weight of auxiliary dispersant based on 100 parts by weight of water.

Also, in order for the dispersion properties of the resin particles in water to become good, usually 20 to 100 parts by weight of resin particles based on 100 parts by weight of water is preferably used.

The pre-expanded particles obtained in this way preferably have two melting peaks in the DSC curve obtained by differential scanning calorimetry. Furthermore, the difference of the two melting peak temperatures is preferably at least 10° C. In the case that the pre-expanded particles have two melting peaks, in-mold expansion moldability is good and an in-mold expanded article having good mechanical strength and heat resistance can be obtained.

Here, the DSC curve of the pre-expanded particles obtained by differential scanning calorimetry is the DSC curve obtained when 1 to 10 mg of pre-expanded particles are heated from 40° C. to 220° C. at a heating rate of 10° C./minute using a differential scanning calorimeter.

The pre-expanded particles having two melting peaks can easily be obtained by setting the temperature within the pressure vessel when pre-expanding to a suitable value. Regarding the temperature within the pressure vessel, usually the lower limit is adjusted to a temperature which is at least the softening point of polypropylene resin, which is the main component of the polypropylene resin composition, preferably to at least melting point Tm, more preferably to at least $(Tm+5)°$ C. and preferably to lower than the melting completion point Te, more preferably at most $(Te-2)°$ C.

Here, the melting completion point is the temperature of when the bottom of the melting peak of the DSC curve, obtained by heating 1 to 10 mg of polypropylene resin from 40° C. to 220° C. at a rate of 10° C./minute, then cooling to 40° C. at a rate of 10° C./minute and then heating again to a 220° C. at a rate of 10° C./minute using a differential scanning calorimeter, returns to the baseline position on the high temperature side.

In the method for preparing the pre-expanded particles, heating is conducted for 5 to 60 minutes, more preferably 10 to 30 minutes, while maintaining the adjusted temperature. When the heating time is shorter than 5 minutes, stability in the expansion ratio per batch tends to decrease and when the heating time is longer than 60 minutes, the batch cycle becomes longer and productivity tends to decrease.

Furthermore, the pre-expanded particles of the present invention are preferably prepared with the pressure within the vessel set to at least 0.6 MPa, more preferably at least 1 MPa. When the pressure within the vessel is less than 0.6 MPa, problems such as obstruction of the flow-restricting device (open orifice) tend to occur. The upper limit of the pressure within the vessel is not particularly limited but preferably at most 5 MPa, particularly at most 4 MPa, as creating high pressure requires high facility costs and utility costs.

The pre-expanded particles obtained in this way preferably have water content of 1 to 10%. When the water content is less than 1%, obtaining pre-expanded particles having high expansion ratio tends to be difficult and when the water content is greater than 10%, shrinkage of the pre-expanded particles tends to become large due to coagulation of water after expansion.

The polypropylene resin pre-expanded particles of the present invention obtained in this way can be made into an in-mold expanded article by a conventionally known method. For example, methods which may be used are (1) a method which comprises impregnating the pre-expanded particles with inorganic gas by pressurizing with inorganic gas, thereby applying a pre-determined pressure into the particle, filling into a mold and thermally melting by vapor, (2) a method which comprises pressing the pre-expanded particles by gas pressure to fill into a mold and thermally melting by vapor utilizing the resilience of the particles and (3) a method which comprises filling the pre-expanded particles into a mold without any pre-treatment and thermally melting by steam.

The following methods are preferable embodiments of the present invention. 100 parts by weight of polypropylene resin (A) having a melting point of 130° C. to 165° C. and a MI value of 0.5 to 30 g/10 minutes, 0.05 to 6 parts by weight of isocyanuric acid, melamine or melamine isocyanurate as the compound having a triazine skeleton and molecular weight of at most 300 per triazine skeleton unit (B) and 0 to 10 parts by weight of talc as the inorganic filler (D) are mixed. The mixture is extruded in strands by an extruder and after cooling, the strands are cut into cylindrical resin particles of 1 to 5 mg. The compound having a triazine skeleton and molecular weight of at most 300 per triazine skeleton unit (B) and inorganic filler (D) are preferably added as a master batch prepared in advance. The autoclave pressure vessel was charged with 100 to 500 parts by weight of water, 0.1 to 15 parts by weight of basic calcium tertiary phosphate as the dispersant and 0.0001 to 0.5 part by weight of sodium n-paraffinsulfonate as the auxiliary dispersant based on 100 parts by weight of the resin particles. This is heated to a constant temperature of Tm to Te° C. and after pressurizing to a constant pressure of 1 to 3 MPa by air, pre-expanded particles are prepared by discharging into vapor atmosphere of 90° to 100° C., through a flow-restricting device having an opening of 2 to 10 mmφ.

Hereinafter, the present invention is explained in detail by means of Examples and Comparative Examples, but is not limited thereto.

The composition of the polypropylene resin composition of Examples 1 to 26 and Comparative Examples 1 to 4 is

EXAMPLE 1

Ethylene-propylene random copolymer (melting point 145° C., melting completion point 160° C., MI value 10 g/10 minutes) was used as the polypropylene resin and 0.03% by weight of melamine (product name: Melamine, available from BASF Ltd., decomposition point: 300° C.) having a molecular weight of 126 per triazine skeleton unit as the triazine compound and 2.5% by weight of carbon black as the coloring agent were compounded so that the total equals 100% by weight. The mixture was melt mixed in a 50 mm$\phi$ single screw extruder, extruded into strands from a cylindrical die of 2.2 mm$\phi$ in diameter, cooled with water and cut with a cutter to obtain resin particles of 1.8 mg/particle.

A 0.35 m$^3$ autoclave was charged with 100 parts by weight of the obtained resin particles (65 kg), 200 parts by weight of water, 0.5 part by weight of basic calcium tertiary phosphate and 0.01 part by weight of sodium n-paraffinsulfonate and while agitating, the contents of the autoclave were heated to the inner temperature shown in Table 2. Then, the pressure within the autoclave was increased by compressed air to the pressure inside the vessel shown in Table 2 and the temperature within the vessel was maintained for 30 minutes. A valve located at the lower part of the autoclave was opened and the contents of the autoclave were discharged into saturated vapor atmosphere of 100° C. through an open orifice of 3.6 mm$\phi$ to obtain pre-expanded particles.

As properties of the obtained pre-expanded particles, expansion ratio, the number of melting peaks in the DSC curve obtained by differential scanning calorimetry, open cell ratio, average cell diameter, fluctuation in cell diameter, fluctuation in expansion ratio and water content were measured. The results are shown in Table 2.

EXAMPLES 2 to 7

Pre-expanded particles were obtained in the same manner as in Example 1 except that the amount added of melamine (product name: Melamine, available from BASF Ltd.) was the amount shown in Table 1 and properties were measured. Expansion conditions and results are shown in Table 2.

EXAMPLE 8

Ethylene-propylene random copolymer (melting point 145° C., melting completion point 160° C., MI value 10 g/10 minutes) was used as the polypropylene resin and 0.08% by weight of melamine (product name: Melamine, available from BASF Ltd., decomposition point: 300° C.) having a molecular weight of 126 per triazine skeleton unit as the triazine compound, 0.15% by weight of talc (average particle size 8 $\mu$m) as the inorganic filler and 2.5% by weight of carbon black as the coloring agent were compounded so that the total equals 100% by weight. The mixture was melt mixed in a 50 mm$\phi$ single screw extruder, extruded into strands from a cylindrical die of 2.2 mm$\phi$ in diameter, cooled with water and cut with a cutter to obtain resin particles of 1.8 mg/particle.

A 0.35 m$^3$ autoclave was charged with 100 parts by weight of the obtained resin particles (65 kg), 200 parts by weight of water, 0.5 part by weight of basic calcium tertiary phosphate and 0.01 part by weight of sodium n-paraffinsulfonate and while agitating, the contents of the autoclave were heated to the inner temperature shown in Table 2. Then, the pressure within the autoclave was increased by compressed air to the pressure inside the vessel shown in Table 2 and the temperature within the vessel was maintained for 30 minutes. A valve located at the lower part of the autoclave was opened and the contents of the autoclave were discharged into saturated vapor atmosphere of 100° C. through an open orifice of 3.6 mm$\phi$ to obtain pre-expanded particles.

As properties of the obtained pre-expanded particles, expansion ratio, the number of melting peaks in the DSC curve obtained by differential scanning calorimetry, open cell ratio, average cell diameter, fluctuation in cell diameter, fluctuation in expansion ratio and water content were measured. The results are shown in Table 2.

EXAMPLES 9 to 13

Pre-expanded particles were obtained in the same manner as in Example 8 except that the amount added of melamine (product name: Melamine, available from BASF Ltd.) and talc (average particle size 8 $\mu$m) were the amount shown in Table 1 and properties were measured. Expansion conditions and results are shown in Table 2.

EXAMPLE 14

Resin particles and pre-expanded particles were obtained in the same manner as in Example 8 except that 0.5% by weight of melamine (product name: Melamine, available from BASF Ltd.) as the triazine compound and 0.45% by weight of mica (average particle size 8 $\mu$m) as the inorganic filler were used and properties were measured. Expansion conditions and results are shown in Table 2.

EXAMPLE 15

Resin particles and pre-expanded particles were obtained in the same manner as in Example 8 except that 0.5% by weight of melamine (product name: Melamine, available from BASF Ltd.) as the triazine compound and 0.45% by weight of kaoline (average particle size 0.4 $\mu$m) as the inorganic filler were used and properties were measured. Expansion conditions and results are shown in Table 2.

EXAMPLE 16

Resin particles and pre-expanded particles were obtained in the same manner as in Example 8 except that 0.5% by weight of melamine (product name: Melamine, available from BASF Ltd.) as the triazine compound and 0.45% by weight of refined bentonite (product name: BEN-GEL-23, available from Hojun Kogyo Co., Ltd.) as the inorganic filler were used and properties were measured. Expansion conditions and results are shown in Table 2.

EXAMPLE 17

Resin particles and pre-expanded particles were obtained in the same manner as in Example 8 except that 0.5% by weight of melamine (product name: Melamine, available from BASF Ltd.) as the triazine compound and 0.45% by weight of precipitated calcium carbonate (product name: Brilliant-1500, available from Shiraishi Kogyo Co., Ltd., average particle size 0.2 $\mu$m) as the inorganic filler were used and properties were measured. Expansion conditions and results are shown in Table 2.

EXAMPLE 18

Resin particles and pre-expanded particles were obtained in the same manner as in Example 8 except that 0.5% by weight of melamine (product name: Melamine, available from BASF Ltd.) as the triazine compound and 0.45% by weight of wet synthetic silica (product name: NIPGEL AZ-204, available from Nippon Silica Industrial Co., Ltd., average particle size 1.3 μm) as the inorganic filler were used and properties were measured. Expansion conditions and results are shown in Table 2.

EXAMPLE 19

Resin particles and pre-expanded particles were obtained in the same manner as in Example 1 except that 1% by weight of isocyanuric acid (product name: NEO-CHLOR Cyanuric acid P, available from Shikoku Chemicals Corporation, decomposition point: 330° C.) having a molecular weight of 129 per triazine skeleton unit was used as the triazine compound and properties were measured. Expansion conditions and results are shown in Table 2.

EXAMPLES 20 to 22

Pre-expanded particles were obtained in the same manner as in Example 8 except that isocyanuric acid (product name: NEO-CHLOR Cyanuric acid P, available from Shikoku Chemicals Corporation, decomposition point: 330° C.) as the triazine compound and talc (average particle size 8 μm) as the inorganic filler were used in the amounts shown in Table 1 and properties were measured. Expansion conditions and results are shown in Table 2.

EXAMPLE 23

Resin particles and pre-expanded particles were obtained in the same manner as in Example 8 except that 1% by weight of melamine isocyanurate (available from Nissan Chemical Industries, Ltd., MC-440) which has a molecular weight of 115 per triazine skeleton unit as the triazine compound and 0.45% by weight of talc (average particle size 8 μm) as the inorganic filler were used and properties were measured. Expansion conditions and results are shown in Table 2.

EXAMPLE 24

Resin particles and pre-expanded particles were obtained in the same manner as in Example 8 except that 1% by weight of acetoguanamine (available from Nippon Synthetic Chemical Industry Co., Ltd.) which has a molecular weight of 125 per triazine skeleton unit as the triazine compound and 0.45% by weight of talc (average particle size 8 μm) as the inorganic filler were used and properties were measured. Expansion conditions and results are shown in Table 2.

EXAMPLE 25

Resin particles and pre-expanded particles were obtained in the same manner as in Example 8 except that propylene-butene-1 random copolymer (melting point 148° C., melting completion point 161° C., MI value 8 g/10 minutes) as the polypropylene resin, 0.5% by weight of melamine (product name: Melamine, available from BASF Ltd.) as the triazine compound and 0.45% by weight of talc (average particle size 8 μm) as the inorganic filler were used and properties were measured. Expansion conditions and results are shown in Table 2.

EXAMPLE 26

Resin particles and pre-expanded particles were obtained in the same manner as in Example 8 except that ethylene-propylene-butene-1 random copolymer (melting point 148° C., melting completion point 161° C., MI value 8 g/10 minutes) as the polypropylene resin, 0.5% by weight of melamine (product name: Melamine, available from BASF Ltd.) as the triazine compound and 0.45% by weight of talc (average particle size 8 μm) as the inorganic filler were used and properties were measured. Expansion conditions and results are shown in Table 2.

Comparative Example 1

Resin particles and pre-expanded particles were obtained in the same manner as in Example 1 except that 1% by weight of 2,6-di-tert-4-(4,6-bis(octylthio)-1,3,5-triazine-ilamino)phenol (product name IRGANOX 565, available from Ciba Specialty Chemicals Co., Ltd.) which has a molecular weight of 589 per triazine skeleton unit was used as the triazine compound and properties were measured. Expansion conditions and results are shown in Table 2.

Comparative Example 2

Resin particles and pre-expanded particles were obtained in the same manner as in Example 1 except that 1% by weight of 1,3,5-tris(3,5-di-tert-butyl-4-hydroxybenzyl) 1,3,5-triazine-2,4,6 (1H, 3H, 5H)-trion (product name IRGANOX 3114, available from Ciba Specialty Chemicals Co., Ltd.) which has a molecular weight of 784 per triazine skeleton unit was used as the triazine compound and properties were measured. Expansion conditions and results are shown in Table 2.

Comparative Example 3

Resin particles and pre-expanded particles were obtained in the same manner as in Example 8 except that 1% by weight of 2,6-di-tert-4-(4,6-bis(octylthio)-1,3,5-triazine-ilamino)phenol (product name IRGANOX 565, available from Ciba Specialty Chemicals Co., Ltd.) which has a molecular weight of 589 per triazine skeleton unit as the triazine compound and 0.15% by weight of talc (average particle size 8 μm) as the inorganic filler were used and properties were measured. Expansion conditions and results are shown in Table 2.

Comparative Example 4

Resin particles and pre-expanded particles were obtained in the same manner as in Example 8 except that 1% by weight of 1,3,5-tris(3,5-di-tert-butyl-4-hydroxybenzyl) 1,3,5-triazine-2,4,6 (1H, 3H, 5H)-trion (product name IRGANOX 3114, available from Ciba Specialty Chemicals Co., Ltd.) which has a molecular weight of 784 per triazine skeleton unit as the triazine compound and 0.15% by weight of talc (average particle size 8 μm) as the inorganic filler were used and properties were measured. Expansion conditions and results are shown in Table 2.

As indicated by Examples 1 to 7 and 19, when a polypropylene resin composition which comprises ethylene-propylene random copolymer as polypropylene resin (A) and a compound having a triazine skeleton and molecular weight of at most 300 per triazine skeleton unit (B), is used as the substrate resin, pre-expanded particles of the desired expansion ratio can be obtained without worsening the open cell ratio and also, fluctuation in cell diameter and expansion ratio is small.

Furthermore, as indicated by Examples 8 to 18 and 20 to 24, when using in combination with a pre-determined amount of inorganic filler (D), pre-expanded particles having higher expansion ratio, small fluctuation in cell diameter and expansion ratio can be obtained.

As indicated by Examples 25 and 26, in the case that propylene-butene-1 random copolymer and ethylene-propylene-butene-1 random copolymer are used as polypropylene resin, pre-expanded particles with small fluctuation in cell diameter and expansion ratio can be obtained.

On the other hand, as indicated by Comparative Examples 1 and 2, when a compound having a triazine skeleton and molecular weight of more than 300 per triazine skeleton unit is added, pre-expanded particles with high expansion ratio cannot be obtained and fluctuation in cell diameter and expansion ratio is large. Also, as indicated by Comparative Examples 3 and 4, when a compound having a triazine skeleton and molecular weight of more than 300 per triazine skeleton unit and an inorganic filler are added, though the expansion ratio becomes somewhat larger, improvement in the fluctuation of cell diameter and expansion ratio is not sufficient.

TABLE 1

| Ex. No. | Polypropylene resin | Triazine compound Type | Amount (% by weight) | Inorganic filler Type | Amount (% by weight) | Amount of carbon black (% by weight) |
| --- | --- | --- | --- | --- | --- | --- |
| 1 | Ethylene-propylene random copolymer | Melamine | 0.03 | — | — | 2.5 |
| 2 | Ethylene-propylene random copolymer | Melamine | 0.08 | — | — | 2.5 |
| 3 | Ethylene-propylene random copolymer | Melamine | 0.5 | — | — | 2.5 |
| 4 | Ethylene-propylene random copolymer | Melamine | 1 | — | — | 2.5 |
| 5 | Ethylene-propylene random copolymer | Melamine | 3 | — | — | 2.5 |
| 6 | Ethylene-propylene random copolymer | Melamine | 5 | — | — | 2.5 |
| 7 | Ethylene-propylene random copolymer | Melamine | 10 | — | — | 2.5 |
| 8 | Ethylene-propylene random copolymer | Melamine | 0.08 | Talc | 0.15 | 2.5 |
| 9 | Ethylene-propylene random copolymer | Melamine | 0.08 | Talc | 0.45 | 2.5 |
| 10 | Ethylene-propylene random copolymer | Melamine | 0.5 | Talc | 0.15 | 2.5 |
| 11 | Ethylene-propylene random copolymer | Melamine | 0.5 | Talc | 0.45 | 2.5 |
| 12 | Ethylene-propylene random copolymer | Melamine | 0.5 | Talc | 1 | 2.5 |
| 13 | Ethylene-propylene random copolymer | Melamine | 0.5 | Talc | 3 | 2.5 |
| 14 | Ethylene-propylene random copolymer | Melamine | 0.5 | Mica | 0.45 | 2.5 |
| 15 | Ethylene-propylene random copolymer | Melamine | 0.5 | Kaoline | 0.45 | 2.5 |
| 16 | Ethylene-propylene random copolymer | Melamine | 0.5 | Bentonite | 0.45 | 2.5 |
| 17 | Ethylene-propylene random copolymer | Melamine | 0.5 | Calcium carbonate | 0.45 | 2.5 |
| 18 | Ethylene-propylene random copolymer | Melamine | 0.5 | Silica | 0.45 | 2.5 |
| 19 | Ethylene-propylene random copolymer | Isocyanuric acid | 1 | — | — | 2.5 |
| 20 | Ethylene-propylene random copolymer | Isocyanuric acid | 1 | Talc | 0.15 | 2.5 |
| 21 | Ethylene-propylene random copolymer | Isocyanuric acid | 1 | Talc | 0.45 | 2.5 |
| 22 | Ethylene-propylene random copolymer | Isocyanuric acid | 1 | Talc | 1 | 2.5 |
| 23 | Ethylene-propylene random copolymer | Melamine isocyanurate | 1 | Talc | 0.45 | 2.5 |
| 24 | Ethylene-propylene random copolymer | Acetoguanamine | 1 | Talc | 0.45 | 2.5 |
| 25 | Propylene-butene-1 random copolymer | Melamine | 0.5 | Talc | 0.45 | 2.5 |
| 26 | Ethylene-propylene-butene-1 random copolymer | Melamine | 0.5 | Talc | 0.45 | 2.5 |
| Com. Ex. 1 | Ethylene-propylene random copolymer | IRGANOX 565 | 1 | — | — | 2.5 |

TABLE 1-continued

| | | Polypropylene resin composition | | | | |
|---|---|---|---|---|---|---|
| | | Triazine compound | | Inorganic filler | | Amount of |
| Ex. No. | Polypropylene resin | Type | Amount (% by weight) | Type | Amount (% by weight) | carbon black (% by weight) |
| Com. Ex. 2 | Ethylene-propylene random copolymer | IRGANOX 3114 | 1 | — | — | 2.5 |
| Com. Ex. 3 | Ethylene-propylene random copolymer | IRGANOX 565 | 1 | Talc | 0.15 | 2.5 |
| Com. Ex. 4 | Ethylene-propylene random copolymer | IRGANOX 3114 | 1 | Talc | 0.15 | 2.5 |

TABLE 2

| | Expansion condition | | Properties of pre-expanded particles | | | | | | |
|---|---|---|---|---|---|---|---|---|---|
| Ex. No. | Inner temperature (°C.) | Pressure inside vessel (MPa) | Expansion ratio (times) | Number of peaks | Open cell ratio (%) | Average cell diameter (μm) | Fluctuation in cell diameter | Fluctuation in expansion ratio | Water content (%) |
| 1 | 154 | 3.0 | 6 | 2 | 0.4 | 200 | ○ | ◎ | 1.6 |
| 2 | 154 | 2.8 | 8 | 2 | 0.5 | 220 | ◎ | ◎ | 2.1 |
| 3 | 154 | 2.8 | 12 | 2 | 0.4 | 270 | ◎ | ◎ | 5.3 |
| 4 | 154 | 2.8 | 14 | 2 | 0.6 | 300 | ◎ | ◎ | 6.8 |
| 5 | 154 | 2.8 | 16 | 2 | 0.8 | 340 | ◎ | ◎ | 8.6 |
| 6 | 154 | 2.8 | 18 | 2 | 1.2 | 380 | ◎ | ◎ | 9.5 |
| 7 | 154 | 2.8 | 20 | 2 | 2.1 | 400 | ○ | ○ | 10.6 |
| 8 | 154 | 2.8 | 12 | 2 | 0.6 | 160 | ◎ | ◎ | 2.1 |
| 9 | 154 | 2.3 | 10 | 2 | 0.5 | 120 | ◎ | ◎ | 2.0 |
| 10 | 154 | 2.8 | 16 | 2 | 0.5 | 240 | ◎ | ◎ | 5.1 |
| 11 | 154 | 2.8 | 20 | 2 | 0.6 | 200 | ◎ | ◎ | 5.2 |
| 12 | 154 | 2.8 | 22 | 2 | 0.8 | 120 | ◎ | ◎ | 5.2 |
| 13 | 154 | 2.8 | 24 | 2 | 1.8 | 80 | ◎ | ◎ | 5.3 |
| 14 | 154 | 2.8 | 18 | 2 | 0.5 | 220 | ◎ | ◎ | 5.2 |
| 15 | 154 | 2.8 | 17 | 2 | 0.4 | 230 | ◎ | ◎ | 5.1 |
| 16 | 154 | 2.8 | 17 | 2 | 0.6 | 230 | ◎ | ◎ | 5.3 |
| 17 | 154 | 2.8 | 18 | 2 | 0.4 | 220 | ◎ | ◎ | 5.1 |
| 18 | 154 | 2.8 | 19 | 2 | 0.4 | 210 | ◎ | ◎ | 5.2 |
| 19 | 154 | 3.0 | 8 | 2 | 0.5 | 180 | ◎ | ◎ | 6.9 |
| 20 | 154 | 3.0 | 13 | 2 | 0.6 | 160 | ◎ | ◎ | 7.1 |
| 21 | 154 | 2.0 | 10 | 2 | 0.5 | 120 | ◎ | ◎ | 7.0 |
| 22 | 154 | 3.0 | 17 | 2 | 1.0 | 90 | ◎ | ◎ | 7.1 |
| 23 | 154 | 2.8 | 13 | 2 | 0.5 | 190 | ◎ | ◎ | 5.3 |
| 24 | 154 | 2.8 | 12 | 2 | 0.4 | 160 | ◎ | ◎ | 4.6 |
| 25 | 157 | 2.8 | 20 | 2 | 0.4 | 200 | ◎ | ◎ | 5.1 |
| 26 | 157 | 2.8 | 20 | 2 | 0.4 | 210 | ◎ | ◎ | 5.2 |
| Com. Ex. 1 | 154 | 2.8 | 2 | 2 | 0.5 | 380 | X | X | 0.3 |
| Com. Ex. 2 | 154 | 2.8 | 2 | 2 | 0.4 | 360 | X | X | 0.4 |
| Com. Ex. 3 | 154 | 2.8 | 4 | 2 | 0.5 | 210 | Δ | Δ | 0.6 |
| Com. Ex. 4 | 154 | 2.8 | 4 | 2 | 0.6 | 220 | Δ | Δ | 0.6 |

The composition of the polypropylene resin composition of Examples 27 to 60 and Comparative Examples 5 to 13 are shown in Table 3 and the expansion conditions and properties of the obtained pre-expanded particles are shown in Table 4.

EXAMPLE 27

100 parts by weight of ethylene-propylene random copolymer (melting point 146° C., melting completion point 160° C., MI value 9 g/10 minutes), 2 parts by weight of ethylene ionomer resin (product name: Himilan SD 100, available from Mitsui Dupont Poly Chemical Co., Ltd.) obtained by crosslinking ethylene-(meth)acrylic acid copolymer with a potassium ion as the hydrophilic polymer, 1 part by weight of isocyanuric acid (product name: NEO-CHLOR Cyanuric acid P, available from Shikoku Chemicals Corporation) having a molecular weight of 129 per triazine skeleton unit as the triazine compound and 2.6 parts by weight of carbon black as the coloring agent were compounded. The mixture was melt mixed in a 50 mmφ single screw extruder, extruded into strands from a cylindrical die of 2.2 mmφ in diameter, cooled with water and cut with a cutter to obtain resin particles of 1.8 mg/particle.

A 0.35 m³ autoclave was charged with 100 parts by weight of the obtained resin particles (65 kg), 200 parts by weight of water, 0.5 part by weight of basic calcium tertiary phosphate and 0.01 part by weight of sodium n-paraffinsulfonate and while agitating, the contents of the autoclave were heated to the inner temperature shown in Table 4. Then, the pressure within the autoclave was increased by compressed air to the pressure inside the vessel shown in Table 4 and the temperature within the vessel was maintained for 30 minutes. A valve located at the lower part of the autoclave was opened and, the contents of the autoclave were discharged into saturated vapor atmosphere of 100° C. through an open orifice of 3.2 mmφ to obtain pre-expanded particles.

As properties of the obtained pre-expanded particles, expansion ratio, the number of melting peaks in the DSC curve obtained by differential scanning calorimetry, open cell ratio, average cell diameter, fluctuation in cell diameter and fluctuation in expansion ratio were measured. The results are shown in Table 4.

EXAMPLE 28

100 parts by weight of ethylene-propylene random copolymer (melting point 146° C., melting completion point 160° C., MI value 9 g/10 minutes), 2 parts by weight of ethylene ionomer resin (product name: Himilan SD 100, available from Mitsui Dupont Poly Chemical Co., Ltd.) obtained by crosslinking ethylene-(meth)acrylic acid copolymer with a potassium ion as the hydrophilic polymer, 1 part by weight of isocyanuric acid (product name: NEO-CHLOR Cyanuric acid P, available from Shikoku Chemicals Corporation) having a molecular weight of 129 per triazine skeleton unit as the triazine compound, 0.15 part by weight of talc (average particle size 8 μm) and 2.6 parts by weight of carbon black as the coloring agent were compounded. The mixture was melt mixed in a 50 mmφ single screw extruder, extruded into strands from a cylindrical die of 2.2 mmφ in diameter, cooled with water and cut with a cutter to obtain resin particles of 1.8 mg/particle.

Pre-expanded particles were obtained and properties were measured in the same manner as in Example 27. The results are shown in Table 4.

EXAMPLES 29 to 33

Resin particles and pre-expanded particles were obtained in the same manner as in Example 28 except that the amount to be added of ethylene ionomer resin (product name: Himilan SD 100, available from Mitsui Dupont Poly Chemical Co., Ltd.) obtained by crosslinking ethylene-(meth) acrylic acid copolymer with a potassium ion, isocyanuric acid (product name: NEO-CHLOR Cyanuric acid P, available from Shikoku Chemicals Corporation) and talc (average particle size 8 μm) were the amount shown in Table 3 and properties were measured. The results are shown in Table 4.

EXAMPLE 34

Resin particles and pre-expanded particles were obtained in the same manner as in Example 33 except that mica (average particle size 8 μm) was used as the inorganic filler and properties were measured. The results are shown in Table 4.

EXAMPLE 35

Resin particles and pre-expanded particles were obtained in the same manner as in Example 33 except that kaoline (average particle size 0.4 μm) was used as the inorganic filler and properties were measured. The results are shown in Table 4.

EXAMPLE 36

Resin particles and pre-expanded particles were obtained in the same manner as in Example 33 except that refined bentonite (product name: BEN-GEL-23, available from Hojun Kogyo Co., Ltd.) was used as the inorganic filler and properties were measured. The results are shown in Table 4.

EXAMPLE 37

Resin particles and pre-expanded particles were obtained in the same manner as in Example 33 except that laponite (product name: Laponite XLG, available from Nippon Silica Industrial Co., Ltd.) was used as the inorganic filler and properties were measured. The results are shown in Table 4.

EXAMPLE 38

Resin particles and pre-expanded particles were obtained in the same manner as in Example 33 except that wet synthetic silica (product name: NIPGEL AZ-204, available from Nippon Silica Industrial Co., Ltd., average particle size 1.3 μm) was used as the inorganic filler and properties were measured. The results are shown in Table 4.

EXAMPLE 39

Resin particles and pre-expanded particles were obtained in the same manner as in Example 28 except that precipitated calcium carbonate (product name: Brilliant-1500, available from Shiraishi Kogyo Co., Ltd., average particle size 0.2 μm) was used as the inorganic filler and properties were measured. The results are shown in Table 4.

EXAMPLES 40 to 42

Resin particles and pre-expanded particles were obtained in the same manner as in Example 28 except that ethylene ionomer resin (product name: Himilan 1707, available from Mitsui Dupont Poly Chemical Co., Ltd.) obtained by crosslinking ethylene-(meth)acrylic acid copolymer with a sodium ion was added as the hydrophilic polymer in the amount shown in Table 3 and properties were measured. The results are shown in Table 4.

EXAMPLE 43

Resin particles and pre-expanded particles were obtained in the same manner as in Example 27 except that melamine (product name: Melamine, available from BASF Ltd., decomposition point: 300° C.) which has a molecular weight of 126 per triazine skeleton unit, was used as the triazine compound and properties were measured. The results are shown in Table 4.

EXAMPLE 44

Resin particles and pre-expanded particles were obtained in the same manner as in Example 28 except that melamine (product name: Melamine, available from BASF Ltd., decomposition point: 300° C.) which has a molecular weight of 126 per triazine skeleton unit, was used as the triazine compound and properties were measured. The results are shown in Table 4.

EXAMPLES 45 to 54

Resin particles and pre-expanded particles were obtained in the same manner as in Example 44 except that the amount to be added of ethylene ionomer resin (product name: Himilan SD 100, available from Mitsui Dupont Poly Chemical Co., Ltd.) obtained by crosslinking ethylene-(meth) acrylic acid copolymer with a potassium ion and melamine (product name: Melamine, available from BASF Ltd.) were the amount shown in Table 3 and properties were measured.

The results are shown in Table 4.

EXAMPLE 55

Resin particles and pre-expanded particles were obtained in the same manner as in Example 44 except that ethylene ionomer resin (product name: Himilan 1707, available from Mitsui Dupont Poly Chemical Co., Ltd.) obtained by crosslinking ethylene-(meth)acrylic acid copolymer with a sodium ion was used as the hydrophilic polymer and properties were measured. The results are shown in Table 4.

EXAMPLE 56

Resin particles and pre-expanded particles were obtained in the same manner as in Example 44 except that propylene-butene-1 random copolymer (melting point 148° C., melting completion point 161° C., MI value 8 g/10 minutes) was used as the polypropylene resin and properties were measured. The results are shown in Table 4.

EXAMPLE 57

Resin particles and pre-expanded particles were obtained in the same manner as in Example 44 except that ethylene-propylene-butene-1 random copolymer (melting point 148° C., melting completion point 161° C., MI value 8 g/10 minutes) was used as the polypropylene resin and properties were measured. The results are shown in Table 4.

EXAMPLE 58

Resin particles and pre-expanded particles were obtained in the same manner as in Example 44 except that melamine isocyanurate (product name: Melamine, available from BASF Ltd.) which has a molecular weight of 113 per triazine skeleton unit, was used as the triazine compound and properties were measured. The results are shown in Table 4.

EXAMPLE 59

Resin particles and pre-expanded particles were obtained in the same manner as in Example 28 except that isocyanuric acid (product name: NEO-CHLOR Cyanuric acid P, available from Shikoku Chemicals Corporation) which has a molecular weight of 129 per triazine skeleton unit, was used as the triazine compound in the amount shown in Table 3 and properties were measured. The results are shown in Table 4.

EXAMPLE 60

Resin particles and pre-expanded particles were obtained in the same manner as in Example 28 except that melamine (product name: Melamine, available from BASF Ltd., decomposition point: 300° C.) which has a molecular weight of 126 per triazine skeleton unit, was used as the triazine compound in the amount shown in Table 3 and properties were measured. The results are shown in Table 4.

Comparative Example 5

100 parts by weight of ethylene-propylene random copolymer (melting point 146° C., melting completion point 160° C., MI value 9 g/10 minutes), 2 parts by weight of ethylene ionomer resin (product name: Himilan SD 100, available from Mitsui Dupont Poly Chemical Co., Ltd.) obtained by crosslinking ethylene-(meth)acrylic acid copolymer with a potassium ion as the hydrophilic polymer, 0.15 part by weight of talc (average particle size 8 μm) as the inorganic filler and 2.6 parts by weight of carbon black were compounded. The mixture was melt mixed in a 50 mmφ single screw extruder, extruded into strands from a cylindrical die of 2.2 mmφ in diameter, cooled with water and cut with a cutter to obtain resin particles of 1.8 mg/particle.

Pre-expanded particles were obtained in the same manner as in Example 27 under the expansion conditions shown in Table 4 and properties were measured. The results are shown in Table 4.

Comparative Example 6

Resin particles and pre-expanded particles were obtained in the same manner as in Comparative Example 5 except that mica (average particle size 8 μm) was used as the inorganic filler and properties were measured. The results are shown in Table 4.

Comparative Example 7

Resin particles and pre-expanded particles were obtained in the same manner as in Comparative Example 5 except that kaoline (average particle size 0.4 μm) was used as the inorganic filler and properties were measured. The results are shown in Table 4.

Comparative Example 8

Resin particles and pre-expanded particles were obtained in the same manner as in Comparative Example 5 except that refined bentonite (product name: BEN-GEL-23, available from Hojun Kogyo Co., Ltd.) was used as the inorganic filler and properties were measured. The results are shown in Table 4.

Comparative Example 9

Resin particles and pre-expanded particles were obtained in the same manner as in Comparative Example 5 except that ethylene ionomer resin (product name: Himilan 1707, available from Mitsui Dupont Poly Chemical Co., Ltd.) obtained by crosslinking ethylene-(meth)acrylic acid copolymer with a sodium ion was used as the hydrophilic polymer and properties were measured. The results are shown in Table 4.

Comparative Example 10

Resin particles and pre-expanded particles were obtained in the same manner as in Comparative Example 5 except that propylene-butene-1 random copolymer (melting point 148° C., melting completion point 161° C., MI value 8 g/10 minutes) was used as the olypropylene resin and properties were measured. The results are shown in Table 4.

Comparative Example 11

Resin particles and pre-expanded particles were obtained in the same manner as in Comparative Example 5 except that ethylene-propylene-butene-1 random copolymer (melting point 148° C., melting completion point 161° C., MI value 8 g/10 minutes) was used as the polypropylene resin and properties were measured. The results are shown in Table 4.

Comparative Example 12

Resin particles and pre-expanded particles were obtained in the same manner as in Example 28 except that 2,6-di-tert-4-(4,6-bis(octylthio)-1,3,5-triazine-ilamino)phenol (product name IRGANOX 565, available from Ciba Specialty Chemicals Co., Ltd.) which has a molecular weight of 589 per triazine skeleton unit was used instead of isocyanuric acid and properties were measured. The results are shown in Table 4.

Comparative Example 13

Resin particles and pre-expanded particles were obtained in the same manner as in Example 28 except that 1,3,5-tris(3,5-di-tert-butyl-4-hydroxybenzyl) 1,3,5-triazine-2,4,6(1H,3H,5H)-trion (product name IRGANOX 3114, available from Ciba Specialty Chemicals Co., Ltd.) which has a molecular weight of 784 per triazine skeleton unit was used instead of isocyanuric acid and properties were measured. The results are shown in Table 4.

As indicated by Examples 27 to 33, 40 to 55, 58 to 60, in the case that the pre-expanded particles are prepared from polypropylene resin containing 100 parts by weight of ethylene-propylene random copolymer as polypropylene resin (A), 0.05 to 10 parts by weight of isocyanuric acid, melamine or melamine isocyanurate as the compound having a triazine skeleton and molecular weight of at most 300 per triazine skeleton unit (B), 0.01 to 20 parts by weight of ethylene ionomer resin prepared by crosslinking ethylene-(meth)acrylic acid copolymer with an ion as the hydrophilic polymer (C) and 0 to 10 parts by weight of talc as the inorganic filler (D), pre-expanded particles of the desired expansion ratio can be obtained and fluctuation in cell diameter and expansion ratio is small.

Also, as indicated by Examples 27 to 33, 40 to 55 and 58, by adding 0.05 to 6 parts by weight of isocyanuric acid, melamine or melamine isocyanurate as the compound having a triazine skeleton and molecular weight of at most 300 per triazine skeleton unit (B), not only can fluctuation in cell diameter and expansion ratio of the obtained pre-expanded particles be kept small, but also the open cell ratio can be decreased.

Furthermore, as indicated in Examples 36 to 39, in the case that mica, kaoline, bentonite, laponite, silica or calcium carbonate is used as the inorganic filler, pre-expanded particles with small fluctuation in cell diameter and expansion ratio can be obtained. In the same manner, as indicated in Examples 56 and 57, in the case that propylene-butene-1 random copolymer or ethylene-propylene-butene-1 random copolymer is used as the polypropylene resin, pre-expanded particles with small fluctuation in cell diameter and expansion ratio can be obtained.

On the other hand, as indicated in Comparative Examples 5 to 11, in the case that a compound having a triazine skeleton and molecular weight of at most 300 per triazine skeleton unit is not added, the fluctuation in cell diameter and expansion ratio of the obtained pre-expanded particles is large in comparison to Examples 27 to 60.

In addition, as indicated by Comparative Examples 12 and 13, in the case that a compound having a triazine skeleton and molecular weight of more than 300 per triazine skeleton unit is added, the fluctuation in cell diameter and expansion ratio of the obtained pre-expanded particles is large in comparison to Examples 27 to 60.

TABLE 3

| | | Polypropylene resin composition | | | | | | | |
|---|---|---|---|---|---|---|---|---|---|
| | | Hydrophilic polymer | | Triazine compound | | | Inorganic filler | | Amount of carbon |
| Ex. No. | Polypropylene resin | Type | Amount (part) | Type | Molecular weight per triazine unit | Amount (part) | Type | Amount (part) | black (part) |
| 27 | Ethylene-propylene random copolymer | SD100 | 2.0 | Isocyanuric acid | 129 | 1.0 | — | — | 2.6 |
| 28 | Ethylene-propylene random copolymer | SD100 | 2.0 | Isocyanuric acid | 129 | 1.0 | Talc | 0.15 | 2.6 |
| 29 | Ethylene-propylene random copolymer | SD100 | 2.0 | Isocyanuric acid | 129 | 1.0 | Talc | 0.01 | 2.6 |
| 30 | Ethylene-propylene random copolymer | SD100 | 2.0 | Isocyanuric acid | 129 | 0.5 | Talc | 0.15 | 2.6 |
| 31 | Ethylene-propylene random copolymer | SD100 | 2.0 | Isocyanuric acid | 129 | 0.7 | Talc | 0.15 | 2.6 |
| 32 | Ethylene-propylene random copolymer | SD100 | 0.5 | Isocyanuric acid | 129 | 1.0 | Talc | 0.15 | 2.6 |
| 33 | Ethylene-propylene random copolymer | SD100 | 1.0 | Isocyanuric acid | 129 | 1.0 | Talc | 0.15 | 2.6 |
| 34 | Ethylene-propylene random copolymer | SD100 | 1.0 | Isocyanuric acid | 129 | 1.0 | Mica | 0.15 | 2.6 |
| 35 | Ethylene-propylene random copolymer | SD100 | 1.0 | Isocyanuric acid | 129 | 1.0 | Kaoline | 0.15 | 2.6 |
| 36 | Ethylene-propylene random copolymer | SD100 | 1.0 | Isocyanuric acid | 129 | 1.0 | Bentonite | 0.15 | 2.6 |
| 37 | Ethylene-propylene random copolymer | SD100 | 1.0 | Isocyanuric acid | 129 | 1.0 | Laponite | 0.15 | 2.6 |
| 38 | Ethylene-propylene random copolymer | SD100 | 1.0 | Isocyanuric acid | 129 | 1.0 | Silica | 0.15 | 2.6 |
| 39 | Ethylene-propylene random copolymer | SD100 | 2.0 | Isocyanuric acid | 129 | 1.0 | Calcium carbonate | 0.15 | 2.6 |
| 40 | Ethylene-propylene random copolymer | 1707 | 0.5 | Isocyanuric acid | 129 | 1.0 | Talc | 0.15 | 2.6 |
| 41 | Ethylene-propylene random copolymer | 1707 | 1.0 | Isocyanuric acid | 129 | 1.0 | Talc | 0.15 | 2.6 |
| 42 | Ethylene-propylene random copolymer | 1707 | 2.0 | Isocyanuric acid | 129 | 1.0 | Talc | 0.15 | 2.6 |
| 43 | Ethylene-propylene random copolymer | SD100 | 2.0 | Melamine | 126 | 1.0 | — | — | 2.6 |

TABLE 3-continued

| | | Polypropylene resin composition | | | | | | | |
|---|---|---|---|---|---|---|---|---|---|
| | | Hydrophilic polymer | | Triazine compound | | | Inorganic filler | | Amount of carbon black (part) |
| Ex. No. | Polypropylene resin | Type | Amount (part) | Type | Molecular weight per triazine unit | Amount (part) | Type | Amount (part) | |
| 44 | Ethylene-propylene random copolymer | SD100 | 2.0 | Melamine | 126 | 1.0 | Talc | 0.15 | 2.6 |
| 45 | Ethylene-propylene random copolymer | SD100 | 2.0 | Melamine | 126 | 0.06 | Talc | 0.15 | 2.6 |
| 46 | Ethylene-propylene random copolymer | SD100 | 2.0 | Melamine | 126 | 0.1 | Talc | 0.15 | 2.6 |
| 47 | Ethylene-propylene random copolymer | SD100 | 2.0 | Melamine | 126 | 0.5 | Talc | 0.15 | 2.6 |
| 48 | Ethylene-propylene random copolymer | SD100 | 2.0 | Melamine | 126 | 3.0 | Talc | 0.15 | 2.6 |
| 49 | Ethylene-propylene random copolymer | SD100 | 2.0 | Melamine | 126 | 4.0 | Talc | 0.15 | 2.6 |
| 50 | Ethylene-propylene random copolymer | SD100 | 0.05 | Melamine | 126 | 1.0 | Talc | 0.15 | 2.6 |
| 51 | Ethylene-propylene random copolymer | SD100 | 0.1 | Melamine | 126 | 1.0 | Talc | 0.15 | 2.6 |
| 52 | Ethylene-propylene random copolymer | SD100 | 3.0 | Melamine | 126 | 1.0 | Talc | 0.15 | 2.6 |
| 53 | Ethylene-propylene random copolymer | SD100 | 5.0 | Melamine | 126 | 1.0 | Talc | 0.15 | 2.6 |
| 54 | Ethylene-propylene random copolymer | SD100 | 8.0 | Melamine | 126 | 1.0 | Talc | 0.15 | 2.6 |
| 55 | Ethylene-propylene random copolymer | SD100 | 2.0 | Melamine | 126 | 1.0 | Talc | 0.15 | 2.6 |
| 56 | Propylene-butene-1 random copolymer | SD100 | 2.0 | Melamine | 126 | 1.0 | Talc | 0.15 | 2.6 |
| 57 | Ethylene-propylene-butene-1 random copolymer | SD100 | 2.0 | Melamine | 126 | 1.0 | Talc | 0.15 | 2.6 |
| 58 | Ethylene-propylene random copolymer | SD100 | 2.0 | Melamine isocyanurate | 113 | 1.0 | Talc | 0.15 | 2.6 |
| 59 | Ethylene-propylene random copolymer | SD100 | 2.0 | Isocyanuric acid | 129 | 10.0 | Talc | 0.15 | 2.6 |
| 60 | Ethylene-propylene random copolymer | SD100 | 2.0 | Melamine | 126 | 10.0 | Talc | 0.15 | 2.6 |
| 59 | Ethylene-propylene random copolymer | SD100 | 2.0 | Isocyanuric acid | 129 | 10.0 | Talc | 0.15 | 2.6 |
| 60 | Ethylene-propylene random copolymer | SD100 | 2.0 | Melamine | 126 | 10.0 | Talc | 0.15 | 2.6 |
| Com. Ex. 5 | Ethylene-propylene random copolymer | SD100 | 2.0 | — | — | — | Talc | 0.15 | 2.6 |
| Com. Ex. 6 | Ethylene-propylene random copolymer | SD100 | 2.0 | — | — | — | Mica | 0.15 | 2.6 |
| Com. Ex. 7 | Ethylene-propylene random copolymer | SD100 | 2.0 | — | — | — | Kaoline | 0.15 | 2.6 |
| Com. Ex. 8 | Ethylene-propylene random copolymer | SD100 | 2.0 | — | — | — | Bentonite | 0.15 | 2.6 |
| Com. Ex. 9 | Ethylene-propylene random copolymer | 1707 | 2.0 | — | — | — | Talc | 0.15 | 2.6 |
| Com. Ex. 10 | Propylene-butene-1 random copolymer | SD100 | 2.0 | — | — | — | Talc | 0.15 | 2.6 |
| Com. Ex. 11 | Ethylene-propylene butene-1 random copolymer | SD100 | 2.0 | — | — | — | Talc | 0.15 | 2.6 |
| Com. Ex. 12 | Ethylene-propylene random copolymer | SD100 | 2.0 | IRGANOX565 | 589 | 1.0 | Talc | 0.15 | 2.6 |
| Com. Ex. 13 | Ethylene-propylene random copolymer | SD100 | 2.0 | IRGANOX3114 | 784 | 1.0 | Talc | 0.15 | 2.6 |

TABLE 4

| Ex. No. | Expansion condition Inner temperature (°C.) | Pressure inside vessel (MPa) | Properties of pre-expanded particles Expansion ratio (times) | Number of peaks | Open cell ratio (%) | Average cell diameter (μm) | Fluctuation in cell diameter | Fluctuation in expansion ratio |
|---|---|---|---|---|---|---|---|---|
| 27 | 156 | 2.6 | 11 | 2 | 3 | 220 | ◉ | ◉ |
| 28 | 156 | 2.6 | 16 | 2 | 2 | 180 | ◉ | ◉ |
| 29 | 156 | 2.6 | 14 | 2 | 3 | 200 | ◉ | ◉ |
| 30 | 156 | 2.6 | 15 | 2 | 2 | 180 | ◉ | ◉ |
| 31 | 156 | 2.6 | 15 | 2 | 2 | 180 | ◉ | ◉ |
| 32 | 156 | 2.6 | 13 | 2 | 3 | 170 | ◉ | ◉ |
| 33 | 156 | 2.6 | 14 | 2 | 2 | 180 | ◉ | ◉ |
| 34 | 156 | 2.6 | 12 | 2 | 3 | 240 | ◉ | ◉ |
| 35 | 156 | 2.6 | 12 | 2 | 2 | 240 | ◉ | ◉ |
| 36 | 156 | 2.6 | 12 | 2 | 2 | 260 | ◉ | ◉ |
| 37 | 156 | 2.6 | 12 | 2 | 3 | 240 | ◉ | ◉ |
| 38 | 156 | 2.6 | 12 | 2 | 3 | 260 | ◉ | ◉ |
| 39 | 156 | 2.6 | 18 | 2 | 3 | 210 | ◉ | ◉ |
| 40 | 156 | 2.6 | 9 | 2 | 3 | 160 | ◉ | ◉ |
| 41 | 156 | 2.6 | 10 | 2 | 3 | 160 | ◉ | ◉ |
| 42 | 156 | 2.6 | 12 | 2 | 3 | 150 | ◉ | ◉ |
| 43 | 156 | 2.6 | 12 | 2 | 2 | 300 | ◉ | ◉ |
| 44 | 156 | 2.6 | 16 | 2 | 3 | 260 | ◉ | ◉ |
| 45 | 156 | 2.6 | 9 | 2 | 2 | 350 | ○ | ○ |
| 46 | 156 | 2.6 | 10 | 2 | 2 | 320 | ◉ | ◉ |
| 47 | 156 | 2.6 | 11 | 2 | 2 | 300 | ◉ | ◉ |
| 48 | 156 | 2.6 | 20 | 2 | 4 | 170 | ◉ | ◉ |
| 49 | 156 | 2.6 | 21 | 2 | 6 | 100 | ◉ | ◉ |
| 50 | 156 | 2.6 | 10 | 2 | 2 | 320 | ○ | ○ |
| 51 | 156 | 2.6 | 11 | 2 | 3 | 300 | ◉ | ◉ |
| 52 | 156 | 2.6 | 19 | 2 | 4 | 220 | ◉ | ◉ |
| 53 | 156 | 2.6 | 20 | 2 | 4 | 180 | ◉ | ◉ |
| 54 | 156 | 2.6 | 22 | 2 | 5 | 120 | ◉ | ○ |
| 55 | 156 | 2.6 | 9 | 2 | 3 | 220 | ◉ | ◉ |
| 56 | 157 | 2.7 | 16 | 2 | 2 | 280 | ◉ | ◉ |
| 57 | 157 | 2.7 | 16 | 2 | 2 | 260 | ◉ | ◉ |
| 58 | 156 | 2.6 | 13 | 2 | 3 | 180 | ◉ | ◉ |
| 59 | 156 | 2.6 | 22 | 2 | 8 | 80 | ◉ | ○ |
| 60 | 156 | 2.6 | 23 | 2 | 8 | 80 | ◉ | ○ |
| Com. Ex. 5 | 156 | 2.6 | 12 | 2 | 3 | 170 | Δ | Δ |
| Com. Ex. 6 | 156 | 2.6 | 10 | 2 | 2 | 200 | X | X |
| Com. Ex. 7 | 156 | 2.6 | 10 | 2 | 3 | 190 | X | X |
| Com. Ex. 8 | 156 | 2.6 | 10 | 2 | 3 | 210 | Δ | Δ |
| Com. Ex. 9 | 156 | 2.6 | 7 | 2 | 2 | 130 | Δ | X |
| Com. Ex. 10 | 156 | 2.6 | 6 | 2 | 2 | 120 | Δ | X |
| Com. Ex. 11 | 156 | 2.6 | 6 | 2 | 2 | 130 | Δ | X |
| Com. Ex. 12 | 156 | 2.6 | 12 | 2 | 2 | 180 | Δ | Δ |
| Com. Ex. 13 | 156 | 2.6 | 13 | 2 | 2 | 160 | Δ | Δ |

The method by which the properties of the pre-expanded particles were evaluated is indicated below.

(Expansion Ratio)

After measuring the weight of the pre-expanded particles, the volume was measured by impregnating with ethanol in a 100 ml messcylinder and the true density value was found. The expansion ratio was calculated by dividing the density of the resin particles of the polypropylene resin composition by the true density value.

(Number of Melting Peaks in the DSC Curve Obtained by Differential Scanning Calorimetry)

The number of melting peaks were read from the DSC curve obtained when 1 to 10 mg of pre-expanded particles were heated from 40° C. to 220° C. at a heating rate of 10° C./minute using a differential scanning calorimeter.

(Open Cell Ratio)

The closed cell volume ($V_0$) of the pre-expanded particles was found using an air comparison pychnometer (930 model, made by Beckman Co., Ltd.), the ethanol impregnated volume ($V_1$) of the same samples was additionally found, and the open cell ratio was found from Open cell ratio (%)=(($V_1-V_0$)/$V_1$)×100.

As the open cell ratio increases, decrease in moldability when conducting in-mold expansion molding of the pre-expanded particles and mechanical strength such as compression strength when made into an in-mold expanded article is caused. In order to prevent significant decrease in moldability and mechanical strength, the open cell ratio is preferably at most 6%.

(Average Cell Diameter)

30 pre-expanded particles were randomly picked out of the obtained pre-expanded particles, the cell diameter was measured according to JIS K6402 and the average cell diameter (d) was found. The average cell diameter is preferably approximately 100 to 500 μm in view of moldability when conducting in-mold expansion molding of the pre-expanded particles and color when made into an in-mold expanded article. When made microscopic to less than 50 μm, moldability when conducting in-mold expansion molding tends to decrease.

(Fluctuation in Cell Diameter)

The ratio (cell diameter fluctuation U) of the standard deviation (a) which represents fluctuation in cell diameter and the average cell diameter (d) was found by $$U(\%)=(\sigma/d)\times 100.$$

The smaller U is, the more uniform the cells are. In most cases, when the value of U is at least 20%, unevenness in color tends to become noticeable and as the value of U becomes larger, unevenness in color tends to increase. The value of U was classified and evaluation was conducted according to the following criteria.

⊚: value of U is less than 10%
◯: value of U is at least 10% and less than 20%
Δ: value of U is at least 20% and less than 35%
X: value of U is at least 35[{]ps (Fluctuation in Expansion Ratio)

0.3 to 1 L of the obtained pre-expanded particles were sieved by a JIS Z8801 standard sieve (8 kinds of 3.5, 4, 5, 6, 7, 8, 9 and 10 mesh) and from the weight ratio $W_i$ and expansion ratio $K_i$ of the pre-expanded particles remaining in the sieve, the weighted expansion average ratio $K_{av}$ and expansion ratio standard deviation $\sigma_m$ was calculated by $$K_{av}=\Sigma(K_i\times W_i)$$

$$\sigma_m=\sqrt{[\Sigma\{W_i\times(K_{av}-K_i)^2\}]}.$$

Using these values, expansion ratio fluctuation V was calculated by $$V(\%)=(\sigma_m/K_{av})\times 100.$$

The smaller V is, the smaller the fluctuation in expansion ratio is. The value of V was classified and evaluation was conducted according to the following criteria.

⊚: value of V is less than 7.5%
◯: value of V is at least 7.5% and less than 10%
Δ: value of V is at least 10% and less than 12.5%
X: value of V is at least 12.5% and less than 15%
XX: value of V is at least 15%

(Water Content of the Pre-Expanded Particles)

After dehydrating the surface of the pre-expanded particles immediately after pre-expansion by an airflow, the weight (W1) was measured. Furthermore, the weight (W2) after drying the pre-expanded particles for 12 hours in an oven at 80° C. was measured and the water content was calculated from $$\text{Water content }(\%)=(W1-W2)/W2\times 100.$$

INDUSTRIAL APPLICABILITY

Polypropylene resin pre-expanded particles which have as a base resin, a polypropylene resin composition containing 100 parts by weight of polypropylene resin (A) and a compound having a triazine skeleton and molecular weight of at most 300 per triazine skeleton unit (B) and are prepared with water as the foaming agent, have small fluctuation in expansion ratio and cell diameter and decreased fluctuation in weight and unevenness in color when made into an in-mold expanded article. Furthermore, by including hydrophilic polymer (C) and/or inorganic filler (D), the expansion ratio improves further.

What is claimed is:

1. A polypropylene resin pre-expanded particle comprising as a base resin a polypropylene resin composition containing:

(A) a polypropylene resin and
    (B) a compound having a triazine skeleton and molecular weight of at most 300 per triazine skeleton unit.

2. The polypropylene resin pre-expanded particle of claim 1, which further comprises hydrophilic polymer (C).

3. The polypropylene resin pre-expanded particle of claim 1, wherein said compound (B) having a triazine skeleton and molecular weight of at most 300 per triazine skeleton unit is contained in an amount of 0.05 to 6 parts by weight based on 100 parts by weight of said polypropylene resin (A).

4. The polypropylene resin pre-expanded particle of claim 2, wherein said hydrophilic polymer (C) is contained in an amount of 0.01 to 20 parts by weight based on 100 parts by weight of said polypropylene resin (A).

5. The polypropylene resin pre-expanded particle of claim 1, which further comprises inorganic filler (D).

6. The polypropylene resin pre-expanded particle of claim 5, wherein said inorganic filler (D) is contained in an amount of 0.005 to 10 parts by weight based on 100 parts by weight of said polypropylene resin (A).

7. The polypropylene resin pre-expanded particle of claim 1, wherein said polypropylene resin (A) is at least one member selected from the group consisting of ethylene-propylene random copolymer, propylene-butene-1 random copolymer and ethylene-propylene-butene-1 random copolymer.

8. The polypropylene resin pre-expanded particle of claim 1, wherein said compound (B) having a triazine skeleton and molecular weight of at most 300 per triazine skeleton unit is at least one member selected from the group consisting of melamine, isocyanuric acid and melamine isocyanurate.

9. The polypropylene resin pre-expanded particle of claim 2, wherein said hydrophilic polymer (C) is an ethylene ionomer resin obtained by crosslinking an ethylene-(meth) acrylic acid copolymer with an alkali metal ion.

10. The polypropylene resin pre-expanded particle of claim 1, which has two melting peaks in the DSC curve obtained by differential scanning calorimetry.

11. An in-mold expanded article comprising the polypropylene resin pre-expanded particle of claim 1.

12. The polypropylene resin pre-expanded particle of claim 2, wherein said compound (B) having a triazine skeleton and molecular weight of at most 300 per triazine skeleton unit is contained in an amount of 0.05 to 6 parts by weight based on 100 parts by weight of said polypropylene resin (A).

13. The polypropylene resin pre-expanded particle of claim 2, which further comprises inorganic filler (D).

14. The polypropylene resin pre-expanded particle of claim 2, wherein said polypropylene resin (A) is at least one member selected from the group consisting of ethylene-propylene random copolymer, propylene-butene-1 random copolymer and ethylene-propylene-butene-1 random copolymer.

15. The polypropylene resin pre-expanded particle of claim 2, wherein said compound (B) having a triazine skeleton and molecular weight of at most 300 per triazine skeleton unit is at least one member selected from the group consisting of melamine, isocyanuric acid and melamine isocyanurate.

16. The polypropylene resin pre-expanded particle of claim 2, which has two melting peaks in the DSC curve obtained by differential scanning calorimetry.

17. An in-mold expanded article comprising the polypropylene resin pre-expanded particle of claim 2.

* * * * *